UNITED STATES PATENT OFFICE.

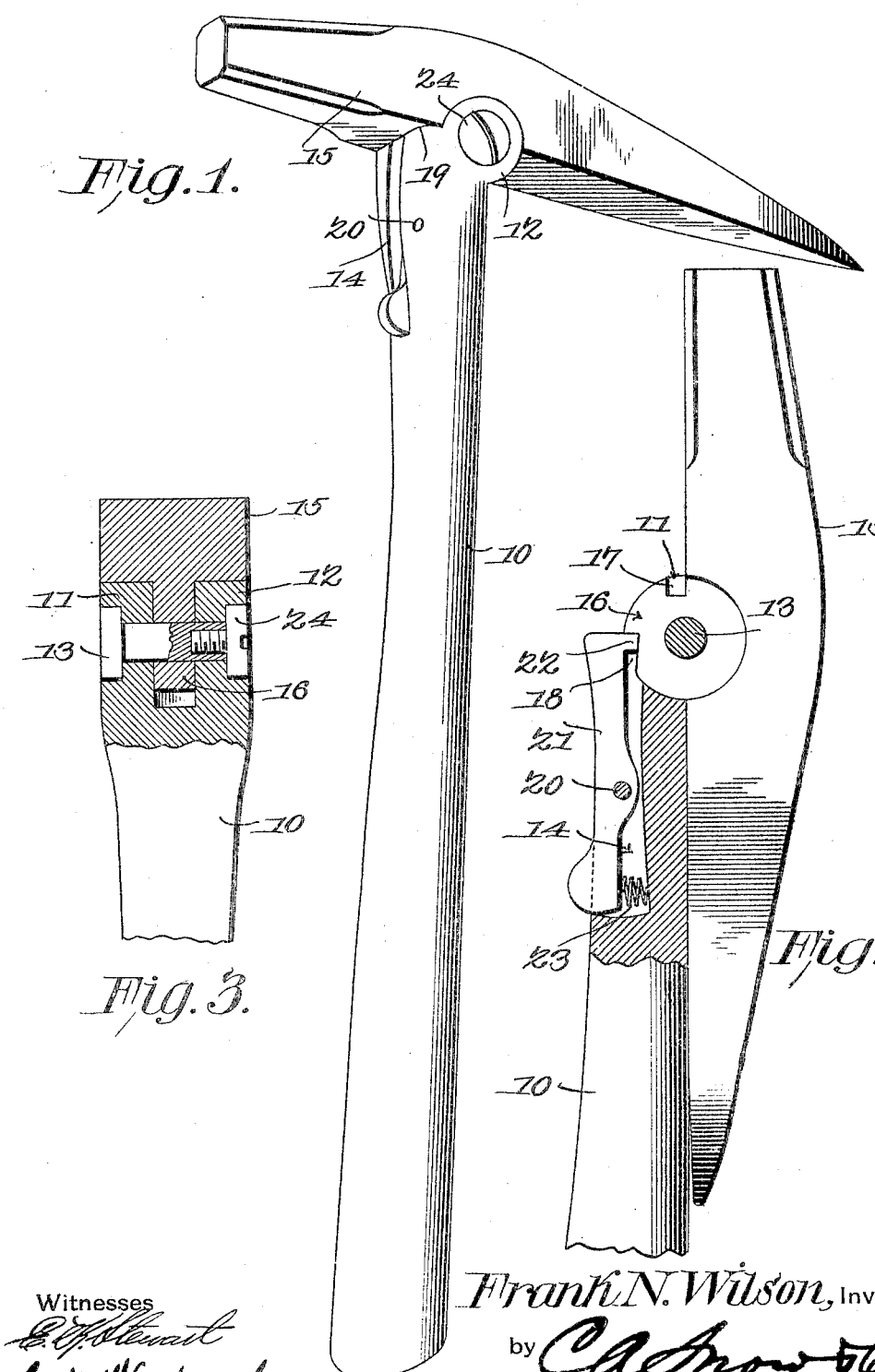

FRANK NELSON WILSON, OF CRIPPLECREEK, COLORADO, ASSIGNOR OF ONE-HALF TO GEORGE D. KILBORNE, OF CRIPPLECREEK, COLORADO.

MINER'S PICK.

No. 802,541. Specification of Letters Patent. Patented Oct. 24, 1905.

Application filed March 18, 1905. Serial No. 250,835.

*To all whom it may concern:*

Be it known that I, FRANK NELSON WILSON, a citizen of the United States, residing at Cripplecreek, in the county of Teller and State of Colorado, have invented a new and useful Miner's Pick, of which the following is a specification.

This invention relates to miners' picks and similar implements, and has for its object to produce a simply-constructed and efficient implement of this class wherein the "head" portion may be folded longitudinally of the handle portion when not in use for convenience of transportation.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a perspective view of the improved implement with the pick-head extended. Fig. 2 is a side view, partially in section, with the pick-head folded. Fig. 3 is a sectional detail of the joint between the handle and pick-heaad.

The improved device comprises a handle 10, having spaced ears 11 12 at one end, provided with transversely-alined apertures to receive a pivot-bolt 13 and with a longitudinal recess 14 extending from between the ears.

The pick-head portion of the device is of the usual form, as at 15, and is provided with a tongue 16 for operating between the ears 11 12 and also engaging the pivot bolt or pin 13, so that the head member will swing upon the handle member. The margin of the tongue 16 is provided with spaced notches 17 18, as shown in Fig. 2.

The handle member is formed with a shoulder 19, upon which the adjacent face of the pick-head bears when the latter is in operative position, as in Fig. 1, and when in folded position, as in Fig. 2, the "point" end of the pick will bear against one side of the handle or lie in longitudinal alinement therewith.

Pivoted at 20 in the recess 14 is a pawl 21, having at one end a lug 22 for alternate engagement with the notches 17 18 and with a spring 23 operating to maintain the lug yieldably in engagement with the notches in the tongue. The pawl thus serves to firmly "lock" the head member 15 in either one of its two positions, as will be obvious.

A simply-constructed and efficient implement is thus produced which may be quickly extended for use when required or folded to occupy a relatively small space when not required.

The device may be employed as a miner's pick or as a prospector's implement or for any other purpose for which it is adapted, and I do not therefore desire to be limited in its use to any particular purpose.

The pivot member 13 will preferably be detachably secured in the ears and tongue, as by a clamp-screw 24, as shown in Fig. 3, so that the pick-head may be replaced when broken or worn, and by supplying a plurality of the pick-heads a dulled head may be quickly replaced by a sharpened one, so that a miner need only carry one handle for his whole supply of sharpened picks, thus materially reducing the weight necessary to be carried into a mine and at the same time also materially reducing the expense.

Having thus described the invention, what is claimed is—

An implement of the class described comprising a handle member having spaced ears at one end offset laterally therefrom and with a shoulder on the end of the handle adjoining said ears, said ears provided with transverse apertures and said handle member provided with a longitudinal channel extending through said shoulder and communicating with the space between said ears, a pick-head having a perforated tongue provided with spaced marginal notches and operating between said ears and bearing upon said shoulder when in operative position, a pivot-bolt movably uniting said ears and tongue, and a spring-actuated pawl operating in said channel and guarded thereby with one end for alternate engagement with the notches in said tongue.

In testimony that I claim the foregoing as my own I have hereto affixed my signature in the presence of two witnesses.

FRANK NELSON WILSON.

Witnesses:
H. C. MORRIS,
GEORGE D. KILBORNE.